P. FINLEY.
Shaft and Pole Coupling.
No. 74,677. Patented Feb. 18, 1868.
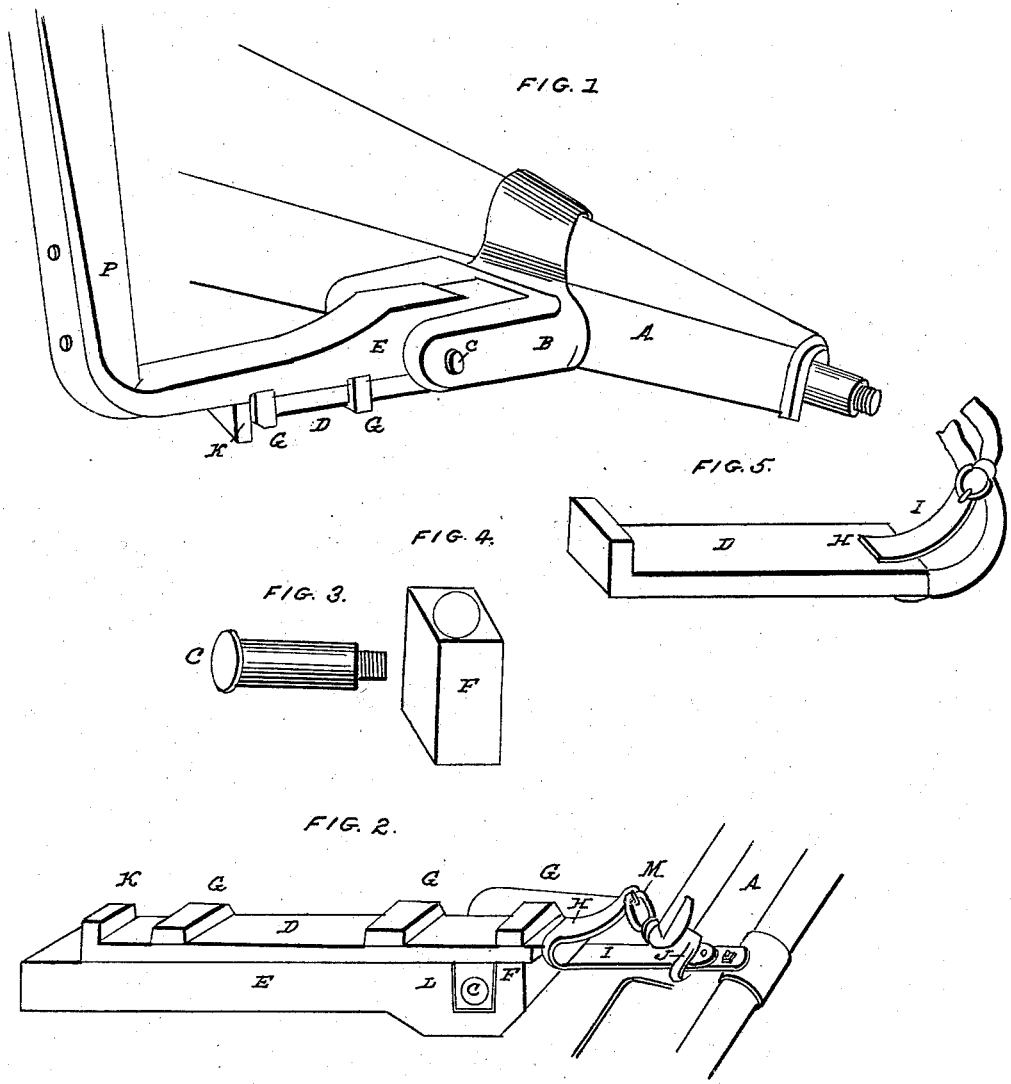

United States Patent Office.

PERRY FINLEY, OF MEMPHIS, TENNESSEE.

Letters Patent No. 74,677, dated February 18, 1868.

IMPROVEMENT IN SHAFT AND POLE-COUPLING.

The Schedule referred to in these Letters Patent and making part of the same.

Be it known that I, PERRY FINLEY, of Memphis, in the county of Shelby, in the State of Tennessee, have invented a new and improved Mode of Coupling Shafts and Poles to Carriages or other vehicles; and I do hereby declare that the following is a full, clear, and exact description of the construction and operation of the same, reference being had to the annexed drawings, making a part of this specification, in which—

Figure 1 is a perspective view.

Figure 2, a transverse section.

Figures 3, 4, and 5, detached parts.

B is the clip; C, clip-bolt; F, square thimble; E, coupling at the end of the shaft or pole; L, groove in coupling E; D, slide; G G G, staples forming a part of coupling E; I, strap; H, mortise in the slide D; M, buckle; J, loop on the under side of the clip; A, axle; P, shaft or pole; K, head of slide D.

I construct my clip in the usual form. I then make a square thimble, F, and place it upon the bolt C, between the jaws of the clip, and fasten the thimble and the bolt in the clip by forming a head upon the point of the bolt C, so as to permit the thimble F to turn upon the bolt C. In place of the round hole in the common coupling, I make a square groove, L, from the under side of the coupling E, to receive the bolt C and thimble F, securing them in their place by a slide, D, and staples G G G. In order to retain the slide D in situation upon the thimble F, I pass a strap, I, through the mortise H, and buckle it at M to the loop J on the under side of the clip B.

When it is desired to couple a shaft or pole, the end is raised and placed with the coupling E within the clip, so as to receive the thimble F within the groove L, (the forward end of the shaft or pole resting on the ground meanwhile.) The slide D is then pushed forward over the thimble E, and secured in place by the strap I, as before described. The coupling is then complete. To uncouple the same, the strap is withdrawn from the mortise H and the slide D drawn back from off the thimble F, allowing the shafts or pole to be lifted from the clip B.

The nature of my invention consists in providing carriages or other vehicles with a shaft and pole-coupler, which will obviate the danger and inconvenience arising from the loosing of the bolt from the ordinary clip, and to facilitate the operation of coupling or uncoupling of a shaft or pole, which I accomplish by the employment of the fixed bolt C, the square thimble F, the coupling E, with its square groove L and staples G G G and the slide D.

Another object of my invention is the formation of a noiseless coupler by the use of the fixed bolt C and square thimble F.

What I claim as my invention, is—

The coupling E, with the groove L and staples G G G, the square thimble F, the slide D, with the mortise H, the strap I, and buckle M, the fixed bolt, arranged substantially for the purposes herein set forth.

PERRY FINLEY.

Witnesses:
JOHN E. FINLEY,
J. T. McCLINTON.